(12) United States Patent
Nakamura et al.

(10) Patent No.: US 9,244,647 B2
(45) Date of Patent: Jan. 26, 2016

(54) DISPLAY APPARATUS, DISPLAY SYSTEM, AND CONTROL METHOD FOR DISPLAY APPARATUS

(71) Applicant: SEIKO EPSON CORPORATION, Tokyo (JP)

(72) Inventors: Yasuhiro Nakamura, Matsumoto (JP); Yoshinori Minamide, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 14/023,998

(22) Filed: Sep. 11, 2013

(65) Prior Publication Data

US 2014/0078021 A1 Mar. 20, 2014

(30) Foreign Application Priority Data

Sep. 18, 2012 (JP) ................................. 2012-204217

(51) Int. Cl.
*G06F 3/14* (2006.01)
*H04N 9/31* (2006.01)

(52) U.S. Cl.
CPC ............ *G06F 3/1423* (2013.01); *H04N 9/3141* (2013.01)

(58) Field of Classification Search
None
See application file for complete search history.

(56) References Cited

U.S. PATENT DOCUMENTS

| 7,663,569 | B2 * | 2/2010 | Ono | G06F 3/14 345/1.2 |
| 7,991,900 | B2 | 8/2011 | Kubota et al. | |
| 2005/0198233 | A1 * | 9/2005 | Manchester | H04L 41/0213 709/221 |
| 2010/0005150 | A1 * | 1/2010 | Kubota | G06F 3/1454 709/212 |
| 2011/0002271 | A1 * | 1/2011 | Ogata | H04L 67/34 370/328 |
| 2011/0216290 | A1 * | 9/2011 | Maruyama | 353/101 |

FOREIGN PATENT DOCUMENTS

JP A-2005-202754 7/2005
JP A-2009-194897 8/2009

* cited by examiner

*Primary Examiner* — Jason Olson
*Assistant Examiner* — Krishna Neupane
(74) *Attorney, Agent, or Firm* — Oliff PLC (57) ABSTRACT

A display apparatus includes: an interface unit which connects a device; a device control unit which, when a communication device is connected to the interface unit, executes communication via the communication device; and a display unit which displays an image based on image data received via the communication device; wherein the device control unit acquires communication information about the communication using the communication device when detachment of the communication device from the interface unit is detected, and detects that a storage device capable of storing data is connected to the interface unit, and stores the communication information into the storage device.

6 Claims, 3 Drawing Sheets

DISPLAY APPARATUS, DISPLAY SYSTEM, AND CONTROL METHOD FOR DISPLAY APPARATUS

The entire disclosure of Japanese Patent Application No. 2012-204217, filed Sep. 18, 2012 is expressly incorporated by reference herein.

BACKGROUND

1. Technical Field

The present invention relates to a display apparatus, a display system, and a control method for a display apparatus.

2. Related Art

According to a related art, a display apparatus which receives and displays image data from an image supply apparatus such as a personal computer is known. Such a display apparatus is usually connected to the image supply apparatus via a communication network.

In order to enable communication between the display apparatus and the image supply apparatus, network connection information such as IP address or SSID, ESSID or the like of a wireless LAN needs to be set. However, the operation to input and set such information is complicated. Therefore, a related-art system is proposed in which an information storage medium storing network connection information is connected to a display apparatus, thus enabling the network connection information to be set in the display apparatus (see, for example, JP-A-2005-202754).

Meanwhile, a communication device used by the display apparatus can be fixed to the display apparatus or can be attachable to and removable from the display apparatus. However, when an information storage medium is used in order to facilitate input of network connection information as described above, a state where both the communication device and the information storage medium are connected to the display apparatus needs to take place and connectors need to be provided in a number corresponding to the state.

SUMMARY

An advantage of some aspects of the invention is that setting of communication-related information is facilitated when a display apparatus and an image supply apparatus are connected in a communicable manner and that restrictions on the connection state or the like of a device to the display apparatus are relaxed.

An aspect of the invention is directed to a display apparatus including: an interface unit which connects a device; a device control unit which, when a communication device is connected to the interface unit, executes communication via the communication device; and a display unit which displays an image based on image data received via the communication device. The device control unit acquires communication information about the communication using the communication device when detachment of the communication device from the interface unit is detected, and detects that a storage device capable of storing data is connected to the interface unit, and stores the communication information into the storage device.

According to this configuration, by connecting a storage device to the interface unit, thus storing communication information used in executing communication via the communication device, into the storage device, and causing an image supply apparatus or the like to read out the communication information stored in storage device, setting of the communication information in such an apparatus can be carried out easily. Also, by connecting the storage device after the communication device is detached, the communication information can be stored in the storage device. That is, the communication device and the storage device need not be connected simultaneously. For example, by sequentially connecting the communication device and the storage device to one interface unit, information can be stored in the storage device and the timing of storing information is not limited, which is advantageous.

Another aspect of the invention is directed to the display apparatus described above, wherein when a wireless communication device connecting to a wireless communication network is connected as the communication device, the device control unit executes communication by the wireless communication device based on designated communication information, and when detachment of the communication device from the interface unit is detected, the device control unit acquires the communication information and stores the communication information into the storage device.

According to this configuration, communication information used for communication can be easily stored in the storage device even when wireless communication is carried out.

Still another aspect of the invention is directed to the display apparatus described above, wherein the interface unit has a connection unit capable of connecting both the communication device and the storage device.

According to this configuration, since the communication device and the storage device can be connected to the same connection unit, the interface unit can be configured to have only one connection unit. Therefore, reduction in the number of components enables simplification of the apparatus configuration and reduction in size of the display apparatus.

Yet another aspect of the invention is directed to the display apparatus described above, wherein when a wired communication device connecting to a wired communication network is connected as the communication device via the wired communication circuit, the device control unit executes communication based on the communication information by the wired communication device, and when detachment of the communication device from the interface unit is detected, the device control unit acquires the communication information and stores the communication information into the storage device.

According to this configuration, even when the wired communication is carried out communication information can be stored in the storage device and used for setting or the like of the image supply apparatus.

Still yet another aspect of the invention is directed to the display apparatus described above, which further includes: a menu display control unit which causes the display unit to display a menu screen; an operation detection unit which detects an input operation; and a setting unit which sets an operation for the device control unit to store information into the storage device, based on the input operation detected by the operation detection unit in a state where the menu screen is displayed by the display unit, and when connection of the storage device to the interface unit is detected after detachment of the communication device from the interface unit is detected, the device control unit carries out an operation based on the setting by the setting unit.

According to this configuration, by displaying a menu screen and carrying out an input operation, whether or not to store communication information into the storage device or the like can be set.

Further another aspect of the invention is directed to a display system includes a display apparatus, a communication device attachable to and removable from the display apparatus, and an image supply apparatus which supplies image data to the display apparatus. The display apparatus includes: an interface unit which connects a device; a device control unit which executes communication via the communication device when the communication device is connected to the interface unit, acquires communication information about the communication using the communication device when detachment of the communication device from the interface unit detected, and when connection of a storage device capable of storing data to the interface unit is detected, stores the communication information into the storage device; and a display unit which displays an image based on image data received via the communication device. When the storage device is connected, the image supply apparatus reads out and sets the communication information from the storage device and carries out communication with the display apparatus.

According to this configuration, in the display system, in which the communication device is connected to the display apparatus to carry out communication, communication information used when the communication device executes communication can be stored in the storage device by connecting the storage device to the display apparatus. As the storage device is connected to the image supply apparatus, the image supply apparatus can read and set the communication information. Therefore, communication information can be easily set in the display apparatus and the image supply apparatus, using the storage device.

Also, the communication device and the storage device need not be connected simultaneously to the display apparatus. For example, the communication device and the storage device can be connected sequentially to one interface unit to store information, and there are no restrictions on the timing of storing information, which is advantageous.

Still further another aspect of the invention is directed to a control method for a display apparatus having an interface unit which connects a device, including: when a communication device is connected to the interface unit, executing communication via the communication device; displaying an image based on image data received via the communication device; acquiring communication information about the communication using the communication device when detachment of the communication device from the interface unit is detected, and when connection of a storage device capable of storing data to the interface unit is detected, storing the communication information in the storage device.

According to this configuration, by connecting a storage device to the interface unit, thus storing communication information used in executing communication via the communication device, into the storage device, and causing an image supply apparatus or the like to read out the communication information stored in storage device, the communication information in such an apparatus can be set easily. Also, by connecting the storage device after the communication device is detached, the communication information can be stored in the storage device. That is, the communication device and the storage device need not be connected simultaneously. Therefore, for example, the communication device and the storage device can be sequentially connected to one interface unit to store information, and there are no restrictions on the timing of storing information, which is advantageous.

According to the aspects of the invention, communication information used by the communication device used in the display apparatus can be stored in the storage device, and for example, the communication information can be easily set in the image supply apparatus, using the storage device. The communication device and the storage device need not be connected simultaneously to the display apparatus and restrictions on the configuration of the interface unit and the timing of storing information can be avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
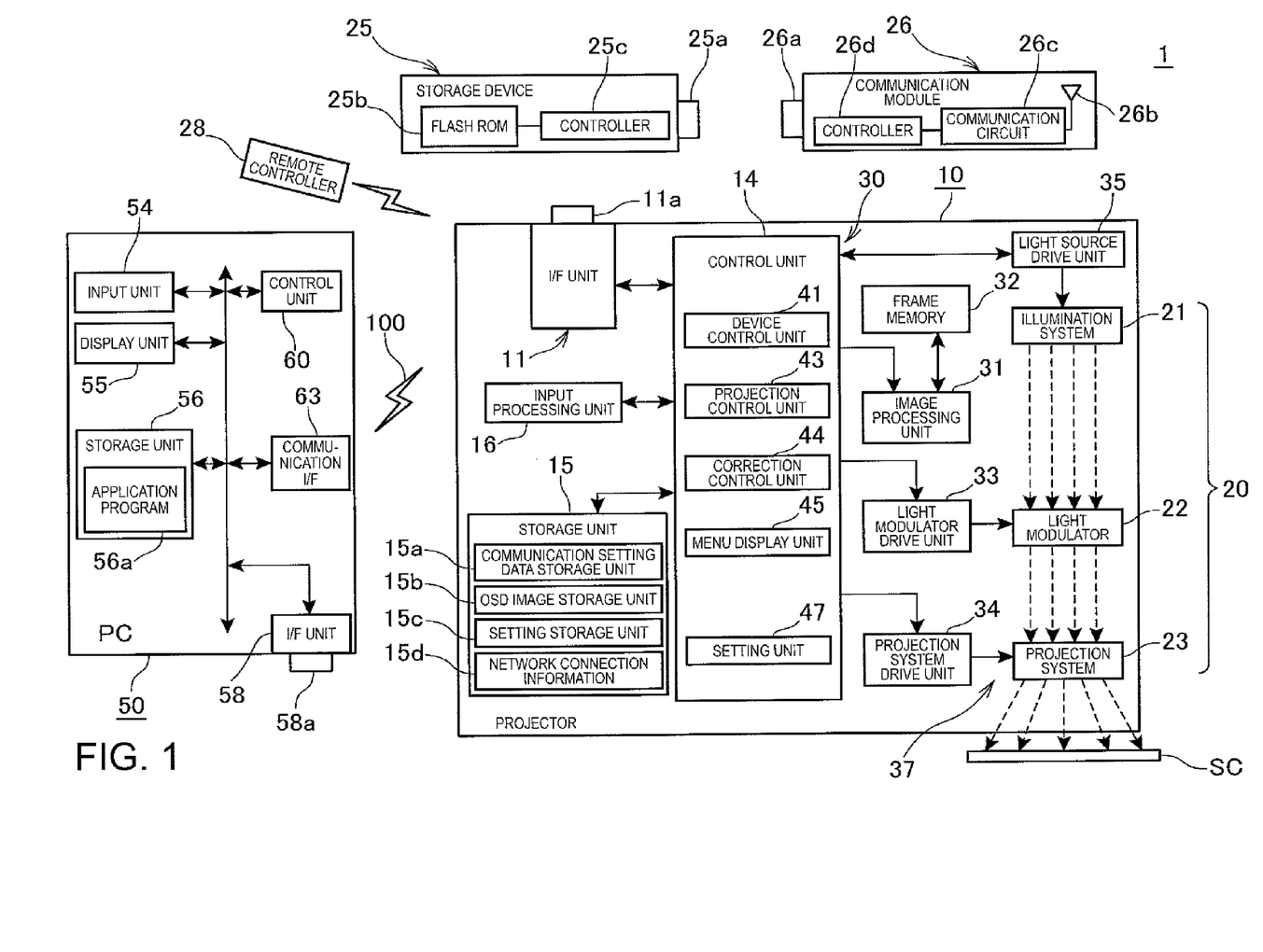
FIG. 1 is a functional block diagram of a projection system according to an embodiment of the invention.

FIG. 1 is a functional block diagram showing the configuration of a projector 10 and a PC 50 forming a projection system 1 (display system) according to an embodiment of the invention.

In the projection system 1, the PC (personal computer) 50 as an image supply apparatus which supplies an image is connected to the projector 10 as a type of display device which projects an image on a screen SC as a projection surface.

The projector 10 is connected to a computer such as the PC 50 or an external image supply apparatus such as various kinds of image players, via a communication channel. The communication channel may be wired or wireless. Various communication methods such as DVI interface, HDMI interface Ethernet (trademark registered), wireless LAN, and UWB can be used. In this embodiment, a case where a wireless communication network 100 conforming to wireless LAN standards is used as the communication channel is described. In the projection system 1, image data transmitted from the PC 50 to the projector 10 may be dynamic image (video) data or may be still image data.

The projector 10 has an interface unit (I/F) 11 as an interface for external connection. The interface unit 11 has a USB connector 11a conforming to the USE standards. Various devices conforming to the USB standards can be connected to the USE connector 11a. In this embodiment, a case where a communication module 26 and a storage device 25 (storage device) are connected is described as an example.

The communication module 26 has a USE connector 26a connectable to the USE connector 11a. By connecting the communication module 26 to the USB connector 11a, the projector 10 is enabled to connect to the wireless communication network 100. The communication module 26 has an antenna 26b, a communication circuit 26c which sends and receives wireless signals via the antenna 26b, and a controller 26d which controls the communication circuit 26c. The controller 26d is a device controller acting as a USB slave device and executes communication with a control unit 14 of the projector 10.

When the communication module 26 is connected to the USB connector 11a, communication between the controller 26d and the control unit 14 is executed and the communication module 26 is recognized by the projector 10. After that, the control unit 14 of the projector 10 connects to the wireless communication network 100 via the communication module 26. Then, the control unit 14 sends and receives various data to and from the PC 50 via the communication module 26.

The wireless communication network 100 may be a communication channel on which the projector 10 and the PC 50 directly communicate with each other on a one-to-one basis, or may include other PCs, wireless LAN access point, wireless LAN router and the like. In this embodiment, it is assumed that the projector 10 and the PC 50 operate in ad-hoc mode of wireless LAN and directly sends and receives wireless signals to and from each other.

For the projector 10 and the PC 50 to communicate with each other, consistent network connection information (communication information) needs to be set in both the projector 10 and the PC 50. The network connection information refers to information that is necessary for communication via a network, and includes information for designating (identifying) a network to take part in, and information for identification, encryption, decryption and the like of sent or received information. Specifically, the network connection information includes, for example, ESSID, SSID, type of communication protocol, type of encryption method (WEP, AES, TKIP or the like), encryption key for encryption and decryption (WEP key, WAP key or the like) and the like used in the wireless communication network 100. The network connection information may also include information unique to hardware used, such as IP address, subnet mask, and MAC address.

For example, when the projector 10 and the PC 50 communicate with each other using the WEP method, a common SSID and WEP key need to be set in the PC 50 and the projector 10.

An operation to accurately input and set the same network connection information in both the projector 10 and the PC 50 is complicated. Thus, in the projection system 1, the storage device 25 is used in order to facilitate the input and setting of the network connection information.

The storage device 25 has a USB connector 25a connectable to the USB connector 11a, a flash ROM 25b which stores data, and a controller 25c which controls writing and reading of data to and from the flash ROM 25b. The controller 25c is a device controller acting as a USB slave device, and executes communication with the control unit 14 of the projector 10. The projector 10 can write and read data to and from the storage device 25 via the interface unit 11. The projector 10 has a function of writing the network connection information set in the communication module 26 into the storage device 25 when the storage device 25 is connected to the USE connector 11a. When the storage device 25 is connected to the PC 50, the network connection information is loaded from the storage device 25 by the PC 50 and the network connection information is set.

The storage device 25 may be configured similarly to a general-purpose USE memory device or the like. However, it is preferable that the projector 10 can identify that the storage device 25 is a device used for communicating the network connection information. For example, it is preferable that a device control unit 41 of the projector 10 can identify that the storage device 25 is a different device from a general-purpose USB memory device, based on information such as the device ID and vendor ID of the controller 25c of the storage device 25. This is because, as described later, the projector 10 may execute different processing from processing to the storage device 25 such as reading out image data, when a general-purpose USE memory device is connected to the USE connector 11a.

FIGS. 2A to 2D are explanatory views showing procedures for setting network connection information. FIGS. 2A to 2D show the connection state of the communication module 26 and the storage device 25 at each stage.

Figure 2A:
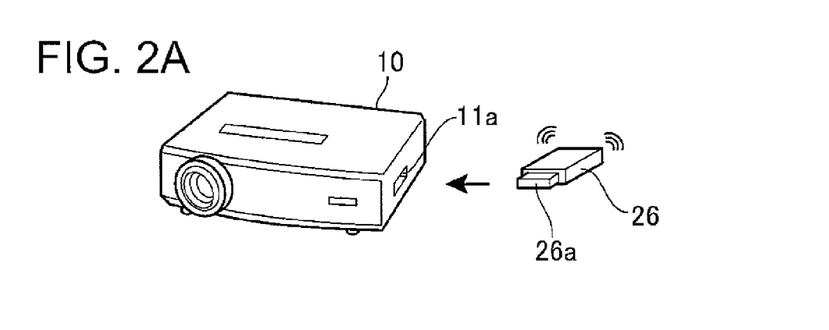
FIGS. 2A to 2D are explanatory views showing procedures for setting network connection information.

In the example of FIGS. 2A to 2D, the USE connector 11a is arranged on a lateral side of the casing of the projector 10. First, as shown in FIG. 2A, the communication module 26 is connected to the USE connector 11a, and network connection information is inputted and set by operating an operation panel (not shown) or by operating a remote controller 28.

Figure 2B:
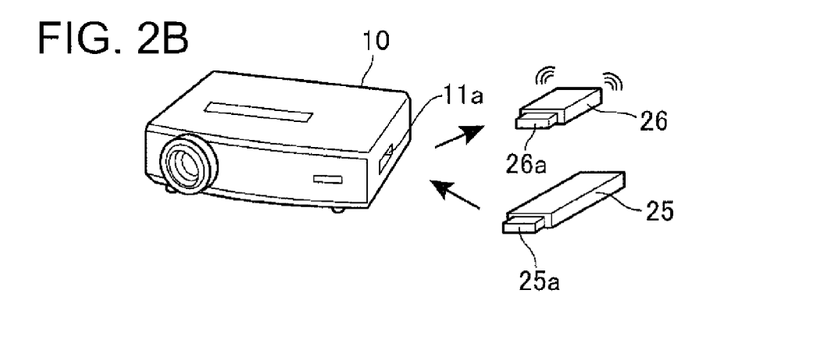

Next, as shown in FIG. 2B, the communication module 26 is detached from the USE connector 11a. At this point, the control unit 14 of the projector 10 detects the detachment of the communication module 26, then acquires the network connection information set in the communication module 26, and temporarily stores the network connection information. Subsequently, the storage device 25 is connected to the USE connector 11a, and the control unit 14 writes the network connection information into the storage device 25.

Figure 2C:
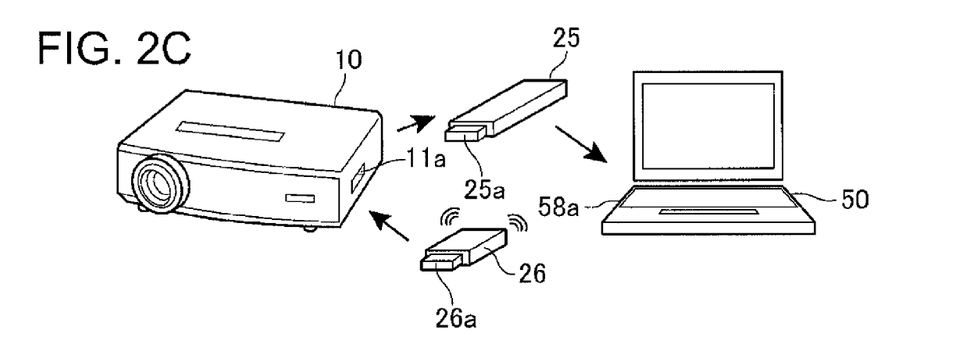

When the storage device 25 is detached from the projector 10 and connected to the PC 50 as shown in FIG. 2C, the network connection information written in the storage device 25 is loaded by the PC 50. Since the PC 50 has a communication interface 63 (FIG. 1) capable of executing wireless communication as described later, wireless communication based on the network connection information that is set is possible.

When the communication module 26 is connected again after the storage device 25 is detached from the projector 10, the projector 10 is enabled to execute wireless communication via the communication module 26.

Figure 2D:
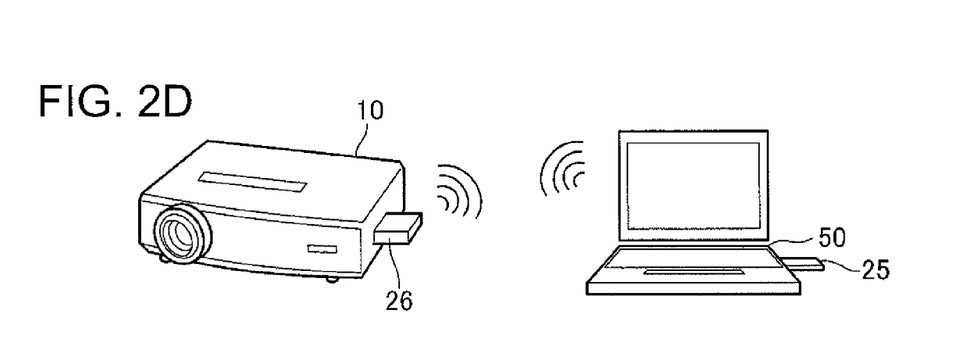

Then, as shown in FIG. 2D, in the state where the communication module 26 is connected to the projector 10 and where the storage device 25 is connected to the PC 50, the projector 10 and the PC 50 are enabled to execute wireless communication with each other. In this state, the projector 10 and the PC 50 execute communication with each other and, for example, image data is supplied from the PC 50 to the projector 10.

According to the procedures described with reference to FIGS. 2A to 2D, the use of the storage device 25 enables setting of common network connection information in the projector 10 and the PC 50, without manually inputting the network connection information at the PC 50. Therefore, setting failure or the like due to an input error can be avoided and the network connection information can be set more easily and quickly.

In the projector 10, after the communication module 26 is connected to the USB connector 11a and network connection information is set therein, if the communication module 26 is replaced with the storage device 25, the network connection information is written in the storage device 25. Moreover, if the storage device 25 is replaced with the communication module 26, the projector 10 is enabled to execute communication via the communication module 26. That is, the setting of the network connection information and the execution of communication via the communication module 26, and the setting of the network connection information via the storage device 25 can be executed by the single USB connector 11a. Therefore, convenience is not impaired even if the projector 10 has only the single USB connector 11a. In other words, the number of USB connectors 11a can be reduced to only one and the projector 10 can be reduced in size without impairing usability.

Back to FIG. 1, the projector 10 has a projection unit 20 which forms an optical image, and an image processing system 30 which electrically processes an image signal inputted to the projection unit 20.

The projection unit 20 includes an illumination system 21, a light modulator 22, and a projection system 23. The illumination system 21 has a light source including a xenon lamp, ultra-high pressure mercury lamp, LED (Light Emitting Diode), laser light source or the like. The illumination system 21 may have a reflector and auxiliary reflector which guide light emitted from the light source to the light modulator 22, or may have a lens group (not shown) or polarizer for improving optical characteristics of projected light, or a dimming element or the like which reduces the amount of light emitted from the light source, on a path to the light modulator 22. A light source drive unit 35 which drives the light source of the illumination system 21 under the control of the control unit 14 is connected to the illumination system 21.

The light modulator 22 receives a signal from the image processing system 30 and modulates light emitted from the illumination system 21 into image light. A specific configuration of the light modulator 22 may include, for example, three transmission-type or reflection-type liquid crystal light valves corresponding to the individual colors of RGB. In this case, light emitted from the illumination system 21 is separated into lights of individual colors of R, G, B by a dichroic mirror and the resulting separate lights become incident on the light modulator 22. The liquid crystal light valves of the light modulator 22 are driven by a light modulator drive unit 33, described later, and modulate the lights of the individual colors. The modulated lights of the individual colors are combined by a cross dichroic prism and then guided to the projection system 23. Alternatively, the light modulator 22 may have, for example, a combination of one liquid crystal light valve and a color wheel, a combination of a single-panel digital mirror device (DMD) and a color wheel, or a system using three DMDs which modulate the individual color lights of RGB. If a single-panel liquid crystal panel or DMD is used, optical components for separating and combining the color lights are not needed.

The projection system 23 has a lens group and the like for projecting the incident light modulated by the light modulator 22 onto the screen SC and thus forming an image. The projection system 23 has motors for adjusting an aperture to control the amount of projected light. A projection system drive unit 34 which drives the motors under the control of the control unit 14 is connected to the projection system 23. By controlling the projection system drive unit 34, enlargement or reduction of a projected image on the screen SC and focus adjustment are carried out.

The image processing system 30 has, as its central component, the control unit 14 which centrally controls the entire projector 10. The image processing system 30 has a storage unit 15 which temporarily stores data processed by the control unit 14 and programs executed by the control unit 14, an input processing unit 16 which detects an input operation, an image processing unit 31 which processes image data stored in the storage unit 15 and image data received from the PC 50, and the light modulator drive unit 33 which drives the light modulator 22 based on an image signal outputted from the image processing unit 31 so as to perform drawing.

A control program to be executed by each control unit forming the control unit 14 is stored in the storage unit 15. The control unit 14 reads out the control program stored in the storage unit 15 and executes the control program, thus controlling each part of the projector 10.

The input processing unit 16 (operation detection unit) has a function of receiving and decoding a wireless signal sent from the remote controller 28 operating the projector 10, and thus detecting an operation on the remote controller 28, and a function of detecting a button operation on the operation panel (not shown) of the projector 10. The input processing unit 16 generates an operation signal indicating an operation on the remote controller 28 and the operation panel and outputs the operation signal to the control unit 14.

Based on the operation information inputted from the input processing unit 16, the control unit 14 detects the content of the operation carried out by the user, then controls the image processing unit 31, the light modulator drive unit 33, projection system drive unit 34, and the light source drive unit 35 in accordance with this operation, and thus causes an image to be projected on the screen SC.

These main components of the projection unit 20 and the image processing system 30 form a display unit 37 which displays an image based on image data.

The storage unit 15 also has a communication setting data storage unit 15*a*, an OSD image storage unit 15*b*, and a setting storage unit 15*c*.

The communication setting data storage unit 15*a* stores information for connecting to the wireless communication network 100 using the communication module 26. For example, network connection information that is set by an operation on the operation panel (not shown) or the remote controller 28 is stored in the communication setting data storage unit 15*a*, and the communication module 26 executes communication based on this network connection information.

The OSD image storage unit 15*b* stores image data of an OSD image projected on the screen SC as being superimposed on a projected image, under the control of the control unit 14. In the OSD image storage unit 15*b* of this embodiment, image data of a menu screen for carrying out settings of functions of the main body of the projector 10 is stored. By operating the remote controller 28 in the state where the OSD image is displayed on the screen SC, the user can carry out various settings about functions of the projector 10.

The setting storage unit 15*c* stores setting information about functions of the main body of the projector 10. This setting information is, for example, information about the setting of whether or not to write network connection information in the storage device 25 when the storage device 25 is connected to the USB connector 11*a*. This setting information is set, for example, when the menu screen as an OSD image is displayed on the screen SC by an operation on the operation panel (not shown) or the remote controller 28.

The control unit 14 has a device control unit 41 which controls a device connected to the interface unit 11, a projection control unit 43 which controls each unit in the image processing system 30 to project an image on the screen SC, a correction control unit 44 which executes keystone correction or the like of an image projected on the screen SC, a menu display unit 45 (menu display control unit) which carries out display control on the OSD-based menu screen, and a setting unit 47 (setting unit) which stores information based on an input operation via the input processing unit 16, into the communication setting data storage unit 15*a* or the setting storage unit 15*c* in accordance with the type of the menu screen. These functional units are realized as the control unit 14 executes programs stored in the storage unit 15.

The device control unit 41 functions as a USE host controller and controls a device connected to the USE connector 11*a*. The device control unit 41 detects that the storage device 25 or the communication module 26 is connected to the USB connector 11*a*, then discriminates the connected device, executes a corresponding device driver program, and enables writing and reading of data to and from the storage device 25 or communication using the communication module 26.

As described above, when the device control unit 41 detects detachment of the communication module 26 from the USE connector 11*a*, the device control unit 41 temporarily stores network connection information used in the communication module 26 into the storage unit 15 as network connection information 15d. After that, when the device control unit 41 detects connection of the storage device 25 to the USB connector 11a, the device control unit 41 reads out the network connection information 15d from the storage unit 15 and writes the network connection information into the storage device 25.

The image processing unit 31, under the control of the control unit 14, acquires image data inputted from the PC 50, discriminates the image size or resolution and whether the image data is a still image or dynamic image, and determines attributes of the image data such as frame rate if the image data is a dynamic image. The image processing unit 31 develops the image into a frame memory 32 by frame. If the resolution of the acquired image data is different from the display resolution of the liquid crystal panel of the light modulator 22, the image processing unit 31 carries out resolution conversion processing and if the zoom is directed with an operation by the remote controller or the operation panel, carries out a processing for enlargement or reduction develops the image after the processing into the frame memory 32. After that, the image processing unit 31 outputs each frame of the image developed in the frame memory 32 to the light modulator drive unit 33 as a display signal.

Meanwhile, the PC 50 has a control unit 60 which executes a program to control each part of the PC 50, an input unit 54 which detects an input operation via an input device (not shown) such as a keyboard or mouse, a display unit 55 which outputs a display signal to a display device (not shown) such as a liquid crystal display and causes the display device to display the result of processing by the control unit 60 and a screen for operation, an interface unit 58 having a USB connector 58a, and a storage unit 56 which stores an application program executed by the control unit 60 and various data in a non-volatile manner.

The control unit 60 is to centrally control the PC 50 and has a CPU which executes various programs, a ROM which stores basic control program or the like executed by the CPU, a RAM forming a work area where programs executed by the CPU and processing target data and the like are temporarily stored, and other peripheral circuits and the like.

The PC 50 has the communication interface (I/F) 63 as an interface for sending and receiving various data such as image data to and from the projector 10 by a wireless communication method. The communication interface 63 has an antenna and a communication circuit or the like, not shown, and is controlled by the CPU of the control unit 60.

The control unit 60 initializes each unit in the PC 50. After that, the control unit 60 reads out and executes an application program 56a stored in the storage unit 56 in accordance with an input operation on the input unit 54 and thus realizes various functions. For example, the control unit 60 outputs image data generated as the control unit 60 executes an application program, image data stored in the storage unit 56, image data of an image displayed on the display unit 55, or image data acquired from an external recording medium or another apparatus, to the projector 10 in accordance with an input operation on the input unit 54.

The interface unit 58 functions as a USB host controller with respect to a USE device connected to the USB connector 58a and controls such a USB device. As described above, when the storage device 25 is connected to the USB connector 58a, the control unit 60 is loaded with network connection information from the storage device 25, sets the network connection information in the communication interface 63, and executes wireless communication based on the network connection information.

Here, when the storage device 25 is connected to the USB connector 58a, the control unit 60 may automatically load a program stored in advance in the flash ROM 25b and execute the program. By executing the program, the control unit 60 may have a function of loading network connection information from the storage device 25 and a function of setting the loaded network connection information into the communication interface 63 and the like. In this case, the above functions can be installed simply by connecting the storage device 25, without having to make any special preparations in the PC 50 as a general computer.

After the setting of the network connection information in the projector 10 is completed, connecting the storage device 25 to the projector 10 and subsequently connecting the storage device 25 to the PC 50 enables wireless communication between the projector 10 and the PC 50 in the projection system 1.

Figure 3:
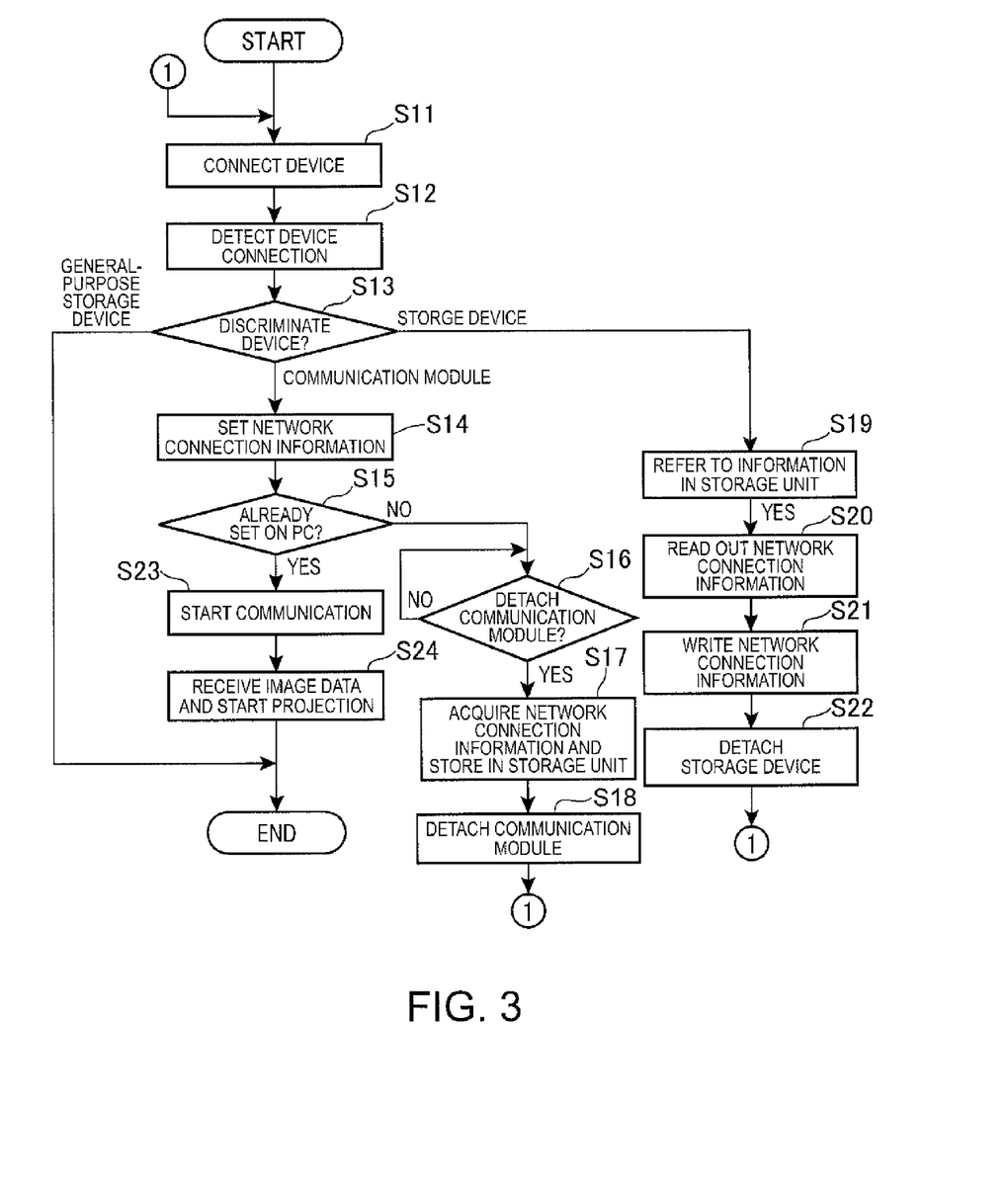
FIG. 3 is a flowchart showing an operation of a projector.

FIG. 3 is a flowchart showing an operation of the projector 10.

When the user connects a device to the USB connector 11a (step S11), the device control unit 41 detects that a device is connected (step S12) and discriminates the type of the connected device (S13). The type of the device is one of general-purpose USB memory device, the communication module 26, and the storage device 25, as described above.

If the device detected as being connected is a general-purpose USB memory device, the device control unit 41 ends this processing immediately. The device control unit 41 may carry out processing to read out image data from the general-purpose USB memory device, or the like, as described later.

If the connected device is discriminated as the communication module 26, the device control unit 41 shifts to step S14 and sets network connection information in the communication module 26. In this step S14, the network connection information is inputted by an operation on the operation panel (not shown) or the remote controller 28, or the network connection information is read out from the communication setting data storage unit 15a and set by the device control unit 41. After setting the network connection information, the device control unit 41 shifts to step S15 and determines whether the storage device 25 is connected to the PC 50 and the network connection information is set therein or not. In step S15, for example, a message for confirming whether the storage device 25 is connected to the PC 50 or not is projected on the screen SC under the control of the control unit 14, and the user operates the remote controller 28 to input whether the storage device 25 is connected to the PC 50 or not.

Here, if the storage device 25 is not connected to the PC 50 (step S15: No), the device control unit 41 discriminates whether the communication module 26 should be detached or not (step S16). For example, if the user operates the remote controller 28 to designate detachment of the communication module 26, the device control unit 41 determines that the communication module 26 should be detached. If the communication module should be detached (step S16: Yes), the device control unit 41 stores communication setting data that is set in the communication module 26 into the storage unit 15 as the network connection information 15d (step S17). As the user pulls the communication module 26 out of the USB connector 11a (step S18), the device control unit 41 returns to step S11.

After that, when a device is connected to the USB connector 11a in step S11, the device control unit 41 detects the connected device in step S12.

If the device connected to the USB connector 11a is determined as the storage device 25 in step S13, the device control unit 41 reads out the network connection information 15d stored in the storage unit 15 (step S20) and writes the network connection information to the storage device 25 (step S21). After that, as the user pulls the storage device 25 out of the USB connector 11a (step S22), the device control unit 41 returns to step S11.

In this way, the communication module 26 is connected to the USB connector 11a and the processing of steps S11 to S17 is executed. After that, the storage device 25 is connected to the USB connector 11a and the processing of steps S19 to S21 is executed. Thus, the network connection information is stored in the storage device 25. When this storage device 25 is connected to the PC 50, the network connection information is set in the PC 50 and the PC 50 is enabled to communicate. Also, when the communication module 26 is connected to the USB connector 11a again, the projector 10 is enabled to communicate.

After that, the device control unit 41 detects connection of a device (step S12), discriminates the type of the connected device (step S13), and sets the network connection information that is already input if the communication module 26 is connected (step S14). If the storage device 25 is connected to the PC 50 (step S15: Yes), the control unit 14 starts wireless communication using the communication module 26 (step S23) and forms the wireless communication network 100 with the PC 50. The control unit receives image data from the PC 50 via the wireless communication network 100 and projects an image on the screen SC based on the image data received from the PC 50, using the functions of the projection control unit 43 and the correction control unit 44 (step S24).

As described above, the projector 10 according to an embodiment of the invention has the device control unit 41, which connects to the wireless communication network 100 via the communication module 26 and executes communication if a device such as the communication module 26 or the storage device 25 is connected, when the communication module 26 is connected to the interface unit 11, and the display unit 37, which displays an image based on image data received via the communication module 26. When the device control unit 41 detects detachment of the communication module 26 from the interface unit 11, the device control unit 41 acquires information about communication using the communication module 26, then detects connection of the storage device 25 capable of storing data, to the interface unit 11, and stores the information into the storage device 25.

According to this configuration, by connecting the storage device 25 to the interface unit 11, the information used in executing communication via the communication module 26 can be stored in the storage device 25. Thus, by using the network connection information stored in the storage device 25, the network connection information can be set in the PC 50 easily and without mistakes. Also, since the communication module 26 and the storage device 25 need not be connected simultaneously, convenience is not impaired even if the projector 10 has only one USB connector 11a.

When the wireless communication module 26 is connected as a communication module, the device control unit 41 connects to the wireless communication network via the communication module 26, based on designated setting information. When detachment of the communication module 26 from the interface unit 11 is detected, the device control unit 41 acquires network connection information and stores the network connection information in the storage device 25. Therefore, the network connection information for carrying out wireless communication can be stored in the storage device 25 and easily set in the PC 50.

The interface unit 11 has, as a connection unit, the USB connector 11a capable of connecting to both the communication module 26 and the storage device 25.

With this configuration, since the communication module 26 and the storage device 25 can be connected to the same connection unit, the interface unit 11 can be configured to have only one connection unit. The reduction in the number of components can enable simplification of the apparatus configuration and reduction in the size of the display apparatus.

Also, the network connection information stored in the storage device 25 can also be used as backup data as well as for setting the network connection information in the PC 50. For example, when the storage device 25 is connected to the USB connector 11a, the device control unit 41 may load the network connection information from the storage device 25 and use the network connection information for communication setting. In this case, the effort to input the network connection information via the remote controller 28 or the operation panel (not shown) in the projector 10 can be omitted.

The above embodiment is only an example of a specific embodiment of the invention and is not intended to limit the invention. The invention can be applied to different embodiments from the above embodiment. For example, in the above embodiment, to set the setting information stored in the setting storage unit 15c, the menu display unit 45 may acquire image data for setting from the OSD image storage unit 15b and display an OSD image on the screen SC according to an operation on the operation panel (not shown) in the projector 10, and the user may operate the remote controller 28 to carry out setting. Items that can be set by using the OSD image include, for example, setting of whether to execute writing of network connection information into the storage device 25 or not. Before writing the network connection information in step S21 of FIG. 3, the device control unit 41 may check the setting of whether to execute the writing or not, while referring to the data stored in the setting storage unit 15c. In this case, it is possible to make a setting not to write the network connection information even when the storage device 25 is connected to the USB connector 11a.

In the projector 10, plural pieces of network connection information may be stored in the communication setting data storage unit 15a in advance, and the plural pieces of network connection information stored in the communication setting data storage unit 15a may be read out and set sequentially under the control of the device control unit 41. The plural pieces of network connection information may be switched and tried until connection to the wireless communication network 100 is successful. In this case, the device control unit 41 stores the network connection information corresponding to a successful communication into the storage unit 15 as the network connection information 15d.

Various devices such as a general-purpose USB memory device or image pickup device can be connected to the USB connector 11a. If a general-purpose USB memory device is connected, the device control unit 41 may search for and read out image data stored in the USB memory device and sequentially project the image data on the screen SC. If an image pickup device such as a digital camera or document camera is connected to the USB connector 11a, the device control unit 41 may project image data inputted from such an image pickup device onto the screen SC.

While the above embodiment is described on the assumption that a communication channel is formed by the wireless communication network 100, a communication channel may be formed by a wired communication network or by both wired and wireless communication networks. If the projector 10 is connected to a wired network, when a wired communication device for executing communication via the wired communication channel is connected as the communication module 26, the device control unit 41 may connect to the network via the wired communication device based on designated network connection information. When detachment of the communication device from the interface unit 11 is detected, the device control unit 41 may acquire the network connection information and stores the network connection information in the storage device 25. The network connection information in this case includes, for example, network address, subnet mask, group name, password and the like.

In this case, since the network connection information for connecting the projector 10 to the network via the communication device can be easily stored in the storage device 25, it is easy to input and save setting information for connecting to the network.

Also, the interface unit 11 is not particular limited as long as the interface unit 11 can connect a device such as the storage device 25 or the communication module 26 to the projector 10. Interfaces conforming to other standards than the USB standards, such as IEEE 1394, can be used.

Moreover, while the display apparatus in the embodiment is described, for example, as a projector which projects an image on the screen SC, the invention is not limited to this example. The invention can also be applied to various display apparatuses such as a liquid crystal monitor or liquid crystal television which displays an image/image on a liquid crystal panel, a monitor apparatus or television receiver which displays an image/image on a PDP (plasma display panel), or a self-emitting display apparatus like a monitor apparatus or television receiver which displays an image/image on an organic EL display panel called OLED (organic light-emitting diode) or OEL (organic electro-luminescence).

What is claimed is:

1. A display apparatus comprising:
    an interface unit which connects a device;
    a device control unit which, when a wireless communication device is connected to the interface unit, executes wireless communication with another device via the wireless communication device; and
    a display unit which displays an image based on image data received via the wireless communication device;
    wherein the device control unit
        acquires communication information about the communication using the wireless communication device when detachment of the wireless communication device from the interface unit is detected, and
        detects that a storage device capable of storing data is connected to the interface unit, and stores the communication information into the storage device, and
    wherein when detection of the detachment of the wireless communication device from the interface unit occurs, the device control unit temporarily stores network connection information used in the wireless communication device in a storage unit of the display apparatus, and subsequently reads out the network connection information and writes the network connection information into the storage device when the storage device is connected to the interface unit.

2. The display apparatus according to claim 1, wherein when the wireless communication device connecting to a wireless communication network is connected as the wireless communication device, the device control unit executes communication by the wireless communication device based on designated communication information, and when detachment of the wireless communication device from the interface unit is detected, the device control unit acquires the communication information and stores the communication information into the storage device.

3. The display apparatus according to claim 1, wherein the interface unit has a connection unit capable of connecting both the wireless communication device and the storage device.

4. The display apparatus according to claim 1, comprising:
    a menu display control unit which causes the display unit to display a menu screen;
    an operation detection unit which detects an input operation; and
    a setting unit which sets an operation for the device control unit to store information into the storage device, based on the input operation detected by the operation detection unit in a state where the menu screen is displayed by the display unit;
    wherein when connection of the storage device to the interface unit is detected after detachment of the wireless communication device from the interface unit is detected, the device control unit carries out an operation based on the setting by the setting unit.

5. A display system comprising a display apparatus, a wireless communication device attachable to and removable from the display apparatus, and an image supply apparatus which supplies image data to the display apparatus,
    wherein the display apparatus includes:
        an interface unit which connects a device;
        a device control unit which executes wireless communication with another device via the wireless communication device when the wireless communication device is connected to the interface unit, acquires communication information about the communication using the wireless communication device when detachment of the wireless communication device from the interface unit is detected, and when connection of a storage device capable of storing data to the interface unit is detected, stores the communication information into the storage device; and
        a display unit which displays an image based on image data received via the wireless communication device, and
    when the storage device is connected, the image supply apparatus reads out and sets the communication information from the storage device and carries out communication with the display apparatus, and
    when detection of the detachment of the wireless communication device from the interface unit occurs, the device control unit temporarily stores network connection information used in the wireless communication device in a storage unit of the display apparatus, and subsequently reads out the network connection information and writes the network connection information into the storage device when the storage device is connected to the interface unit.

6. A control method for a display apparatus having an interface unit which connects a device, comprising:
    when a wireless communication device is connected to the interface unit, executing wireless communication with another device via the wireless communication device;
    displaying an image based on image data received via the wireless communication device; and
    acquiring communication information about the communication using the wireless communication device when detachment of the wireless communication device from the interface unit is detected, wherein, when connection of a storage device capable of storing data to the interface unit is detected, storing the communication information in the storage device, and wherein when detection of the detachment of the wireless communication device from the interface unit occurs, temporarily storing network connection information used in the wireless communication device in a storage unit of the display apparatus, and subsequently reading out the network connection information and writing the network connection information into the storage device when the storage device is connected to the interface unit.

* * * * *